US008285477B2

(12) United States Patent
Tu et al.

(10) Patent No.: US 8,285,477 B2
(45) Date of Patent: Oct. 9, 2012

(54) DETECTION METHOD FOR PREVENTING AUTOMOBILE FROM COLLIDING

(75) Inventors: Po-Jen Tu, Taipei (TW); Jean-Fu Kiang, Taipei (TW)

(73) Assignee: National Taiwan University, Taipei (TW)

( * ) Notice: Subject to any disclaimer, the term of this patent is extended or adjusted under 35 U.S.C. 154(b) by 932 days.

(21) Appl. No.: 12/075,237

(22) Filed: Mar. 10, 2008

(65) Prior Publication Data

US 2009/0171586 A1 Jul. 2, 2009

(30) Foreign Application Priority Data

Dec. 28, 2007 (TW) ................................ 96151049 A

(51) Int. Cl.
*G06G 7/78* (2006.01)

(52) U.S. Cl. ........................................................ 701/301

(58) Field of Classification Search .................. 701/301; 343/9; 356/28.5

See application file for complete search history.

(56) References Cited

U.S. PATENT DOCUMENTS 4,079,377 A * 3/1978 zur Heiden et al. ........... 342/109
4,483,614 A * 11/1984 Rogers ......................... 356/28.5

OTHER PUBLICATIONS

"Decision Making for Collision Avoidance Systems"; Jansson et al.; Society of Automotive Engineers; 2002.*
"A New Threat Assessment Measure for Collision Avoidance Systems"; Zhang et al.; California Institute of Technology; 2006.*
"A Study of Kalman Filter applied to Visual Tracking"; Nathan Funk; University of Alberta; Dec. 7, 2003.*
Po-Jen Tu; "Effective Algorithm for Target Detection with High Precision on Location, Velocity and Acceleration", Graduate Institute of Communication Engineering College of Electrical Engineering and Computer Science; National Taiwan University, Master Thesis; Jul. 2007. pp. 1-48.

* cited by examiner

*Primary Examiner* — John Pauls
(74) *Attorney, Agent, or Firm* — Jackson Walker L.L.P.

(57) ABSTRACT

A detection method for preventing an automobile from colliding is applied to an automobile. The detection method includes the following steps: step (a): providing at least two detection devices, each detection device is used to measure a predetermined information of the automobile. A one-stage linear Kalman filter in each device is used to enhance the signal-to-noise ratio of the predetermined information. In step (b): utilizing the one-stage linear filter to receive the predetermined information and obtain a corrected information from the predetermined information after the signal-to-noise ratio is enhanced. In step (c): calculating the corrected information to obtain a component information having vector components of a first direction and a second direction. In step (d): enhancing the signal-to-noise ratio to enable the component information to be a contrast information. Accordingly, the convergence time of calculating the contrast information can be substantially reduced. The position variation of the surrounding moving objects can be accurately estimated to prevent the sudden collision in a short time.

4 Claims, 1 Drawing Sheet

Providing detection device and one-stage linear Kalman filter for measuring predetermined information of the automobile and enhancing the signal-to-noise ratio of the predetermined information. — 11

Utilizing the one-stage linear Kalman filter to receive the predetermined information, and obtianing corrected information from the predetermined information by enhancing the signal-to-noise ratio — 12

Calculating the corrected information to obtain a component information having a vector components of a first direction and a second direction — 13

Enhancing the signal-to-noise ratio to enable the component information to be a contrast information — 14

Utilizing the contrast information to predict the position variation of the automobile after a predetermined time to obtain a result information — 15

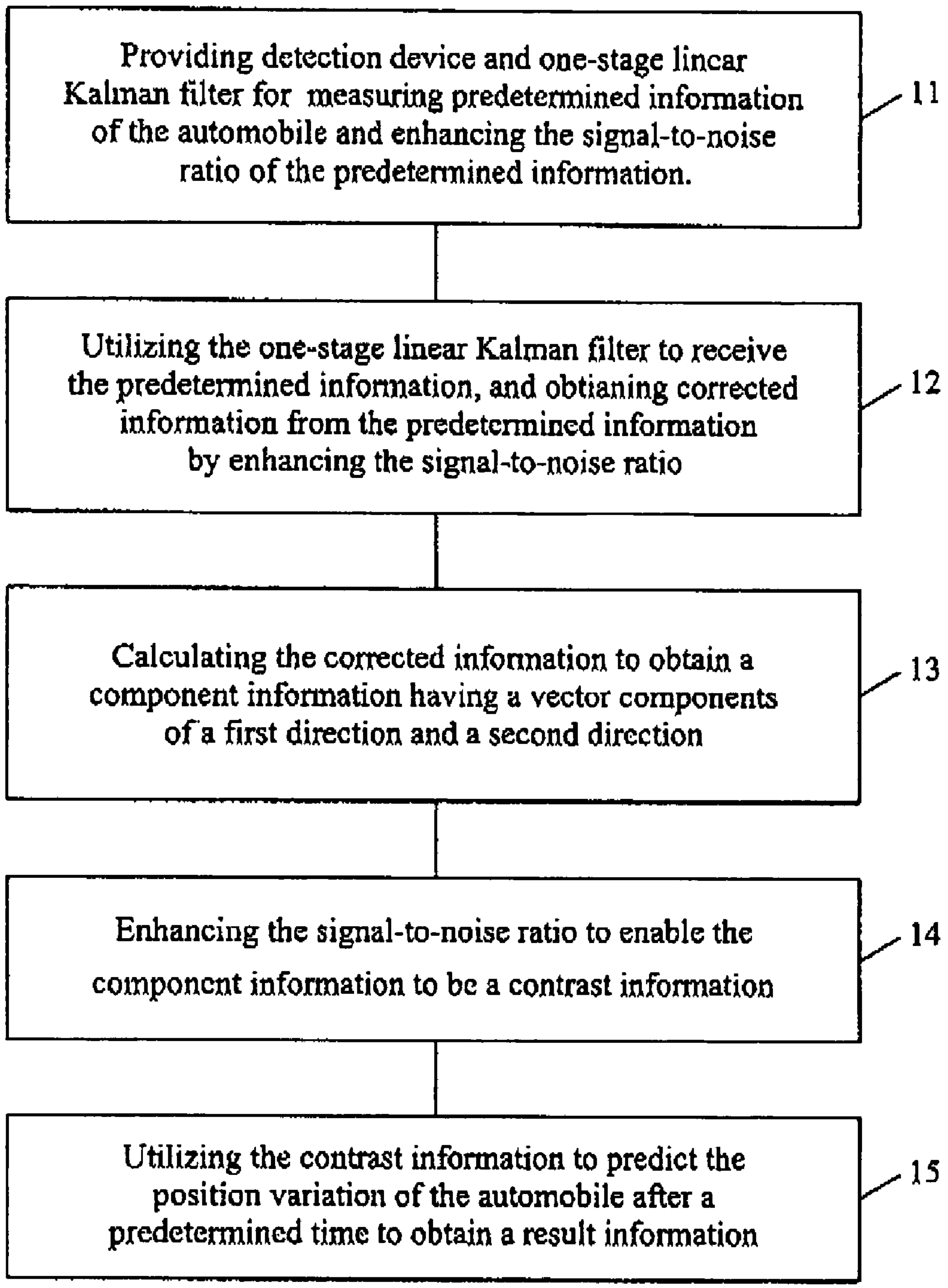
Providing detection device and one-stage linear Kalman filter for measuring predetermined information of the automobile and enhancing the signal-to-noise ratio of the predetermined information.
11
Utilizing the one-stage linear Kalman filter to receive the predetermined information, and obtianing corrected information from the predetermined information by enhancing the signal-to-noise ratio
12
Calculating the corrected information to obtain a component information having a vector components of a first direction and a second direction
13
Enhancing the signal-to-noise ratio to enable the component information to be a contrast information
14
Utilizing the contrast information to predict the position variation of the automobile after a predetermined time to obtain a result information
15

DETECTION METHOD FOR PREVENTING AUTOMOBILE FROM COLLIDING

FIELD OF THE INVENTION

The present invention relates to a detection method for preventing an automobile from colliding, and more particularly to a detection method capable of minimizing the convergence time of calculating the acceleration of an automobile.

DESCRIPTION OF THE PRIOR ART

Automobiles have brought convenience to modern life, however, the automobile accidents happened often lead to loss of life, or damage of property. Therefore, the development of the automotive safety systems for protecting drivers and passengers is an important field of the automotive electronic technology. Basic automotive safety systems are divided into two categories: active safety systems such as anti-collision radars, infrared blind-spot detectors or the like, which can prevent the occurrence of accidents; and passive safety systems such as airbag control system, CMOS image sensor or the like, which can reduce personal injuries when accidents happen. All of the big automobile companies in the world are actively developing intelligent automobiles or intelligent highway systems to improve the safety of automobiles. The related technology also includes the automatic bump-shielded system of the automobile and the like.

In general, an automatic bump-shielded system of the automobile can be separated into three parts: (1) a signal collection system, which employs detection technology such as radars, ultrasonic waves, infrared, or sonar, or the like to measure the relative velocity of the preceding automobile with respect to a controlled automobile and the inter-automobile distance in a short time; (2) a data processing system, which processes the signals such as the inter-automobile distance and the relative velocity of the two automobiles, collected during the movement of the controlled automobile by an automotive computer to determine the safe stopping distance between the two automobiles, and once the inter-automobile distance is out of the safe range, the system would initiate a warning signal; (3) an executive system, which deals with the commands sent from the data processing system and communicates the signals immediately for reminding the driver to keep a safe stopping distance. If the driver takes no action in response to the signals instantly, the executive system can take adequate measures, for example, fastening the seat belts, adjusting the seat positions, stabilizing the steering wheel control, automatic braking or the like, to prevent from colliding.

The major automobile production countries like Germany, Japan and the United States have begun to research and develop automatic anti-collision safety devices, but these devices are not fully applied to automobiles in the market yet. When an automobile is in rapid motion, it is very difficult to accurately monitor the external environment, especially the surrounding moving automobiles. The main architecture of the conventional automobile anti-collision systems introduced by automobile factories is substantially composed of 2 to 4 distance measuring devices and 1 to 4 image sensing devices, which can measure the inter-automobile distance when the automobile is in motion. Once obstacles in front of the automobile or hazardous objects traveling behind at abnormal speed, are detected, the system would automatically actuate the safety device or the warning apparatus, thereby significantly reducing the accident rate. However, the above automobile anti-collision systems require a longer measuring time or still have large measurement errors in a shorter measuring time, so that a new solution is needed.

In view of the drawbacks of the prior art, the inventors of the present invention, based on years of experience in the related industry, develop a detection method for preventing an automobile from colliding to overcome the drawbacks of the prior art.

SUMMARY OF THE INVENTION

The primary objective of the present invention is to provide a detection method for preventing an automobile from colliding, which enables the information sensed from the automobile to pass through two linear filters sequentially in order to substantially reduce the convergence time of calculating the contrast information. Accordingly, the position variation of the surrounding moving objects can be accurately estimated so as to prevent sudden collision in a short time.

Accordingly, to achieve the above objective, the present invention provides a detection method for preventing an automobile from colliding, which is applied to an automobile. The detection method includes the following steps of:

(a) providing at least one detection device and a one-stage linear Kalman filter, wherein the detection device is used for measuring a predetermined information such as a relative position and a relative velocity of a target automobile, and the one-stage linear Kalman filter is used for enhancing the signal-to-noise ratio of the predetermined information;

(b) utilizing the one-stage linear Kalman filter to receive the predetermined information and obtain a corrected information from the predetermined information by enhancing the signal-to-noise ratio;

(c) calculating the corrected information to allow the corrected information to form a component information, wherein the component information is a vector component having a first direction and a second direction;

(d) enhancing the signal-to-noise ratio to enable the component information to be a contrast information;

(e) utilizing the contrast information to predict the position variation of the automobile after a predetermined time to obtain a result information.

The technical features and effects of the present invention may be better understood and appreciated through the preferred embodiment of the present invention described in detail below with reference to the related drawings.

BRIEF DESCRIPTION OF THE DRAWINGS

The subject matter regarded as the invention is particularly pointed out and distinctly claimed in the concluding portion of the specification. The invention together with features and advantages thereof may best be understood by reference to the following detailed description with the accompanying drawings in which:

FIG. 1 is a schematic flow chart showing a preferred embodiment of the detection method for preventing an automobile from colliding in accordance with the present invention.

DETAILED DESCRIPTION OF THE PREFERRED EMBODIMENTS

The present invention relates to a detection method for preventing an automobile from colliding. While the specifications describe at least one embodiment of the invention considered best modes of practicing the invention, it should be understood that the invention can be implemented in many ways and is not limited to the particular examples described below or to the particular manner in which any features of such examples are implemented.

Referring to FIG. 1 for a schematic flow chart of a preferred embodiment of the detection method for preventing an automobile from colliding in accordance with the present invention, the reference numerals 11, 12, 13, 14 and 15 correspond to the step (a) to step (e), respectively, of the detection method for preventing an automobile from colliding according to the present invention.

The detection method for preventing an automobile from colliding in accordance with the present invention is applied to an automobile, including the following steps of:

step (11): providing at least two detection devices, wherein each detection device has a linear frequency modulation (LFM) module and a linear Kalman filter, predetermined information of a target automobile can be calculated by the phase difference and the frequency difference of the signals received by the linear frequency modulation module. Preferably, the predetermined information contains a relative distance r, a relative velocity v and a relative acceleration a of the target automobile. The usage of one-stage linear Kalman filter can enhance the signal-to-noise ratio of the predetermined information;

step (12): utilizing the one-stage linear Kalman filter to receive the predetermined information and obtain a corrected information from the predetermined information by enhancing the signal-to-noise ratio. The corrected information corresponding to the predetermined information include more accurate values of a corrected relative distance r', a corrected relative velocity v' and a corrected relative acceleration a';

step (13): calculating the corrected information by triangulation to obtain a component corrected information having vector components of a first direction and a second direction, which are approximately vertical to each other, that is, the component corrected information has a corrected relative distance x' in the first direction, a corrected relative distance y' in the second direction, a corrected relative velocity vx' in the first direction, a corrected relative velocity vy' in the second direction, a corrected relative acceleration ax' in the first direction and a corrected relative acceleration ay' in the second direction;

step (14): inputting the component corrected information into the one-stage linear Kalman filter and enhancing the signal-to-noise ratio to enable the component information to be a contrast information. The contrast information contains a relative distance x" in the first direction, a relative distance y" in the second direction, a relative velocity vx" in the first direction, a relative velocity vy" in the second direction, a relative acceleration ax" in the first direction and a relative acceleration ay" in the second direction. The above contrast information is a time-varying function; and step (15): utilizing the contrast information to predict the position variation of the target automobile after a predetermined time to obtain a result information since the contrast information is a time-varying function. Then, determining whether or not the target automobile would collide with the controlled automobile based on the result information.

The above-described embodiment is only illustrative, but not limitative. Various equivalent modifications or changes to the present invention can be made to the elements of the present invention without departing from the spirit and scope of this invention. Accordingly, all such equivalent modifications and changes shall fall within the scope of the appended claims.

What is claimed is:

1. A detection method for preventing an automobile from colliding, applied to a controlled automobile, comprising the following steps of:

(a) providing a first detection device and a second detection device, wherein the first detection device and the second detection device are used for measuring a predetermined information of a target automobile, wherein the predetermined information contains a distance from the target automobile to the controlled automobile, a velocity and an acceleration of the target automobile, and the first detection device and the second detection device contain a first one-stage linear Kalman filter and a second one-stage linear Kalman filter, respectively, and the first detection device and the second detection device have a linear frequency modulation module, respectively;

(b) utilizing the first one-stage linear Kalman filter to receive the predetermined information and obtain a corrected information from the predetermined information, wherein the signal-to-noise ratio of the corrected information is higher than that of the predetermined information;

(c) utilizing triangulation to calculate the corrected information to obtain a component corrected information having vector components of a first direction and a second direction, wherein the corrected information corresponding to the predetermined information contains a corrected distance from the target automobile to the controlled automobile, a corrected velocity and a corrected acceleration of the target automobile; and (d) utilizing the second one-stage linear Kalman filter to enable the component corrected information to be a contrast information, wherein the signal-to-noise ratio of the contrast information is higher than that of the component corrected information.

2. The detection method of claim 1, wherein the predetermined information is used for calculating the phase difference and the frequency difference of the signal received by the linear frequency modulation module.

3. The detection method of claim 1, wherein the contrast information is a time-varying function.

4. The detection method of claim 1, further comprising, after step (d), a step of:

(e) utilizing the contrast information to predict the position variation of the target automobile after a predetermined time to obtain a result information.

* * * * *